March 11, 1941.　　　　C. L. ORR　　　　2,234,414
RAILWAY CAR TRUCK
Filed April 29, 1939　　　3 Sheets-Sheet 2

Inventor
C. L. Orr,
By Seymour, Bright & Nottingham
Attorneys

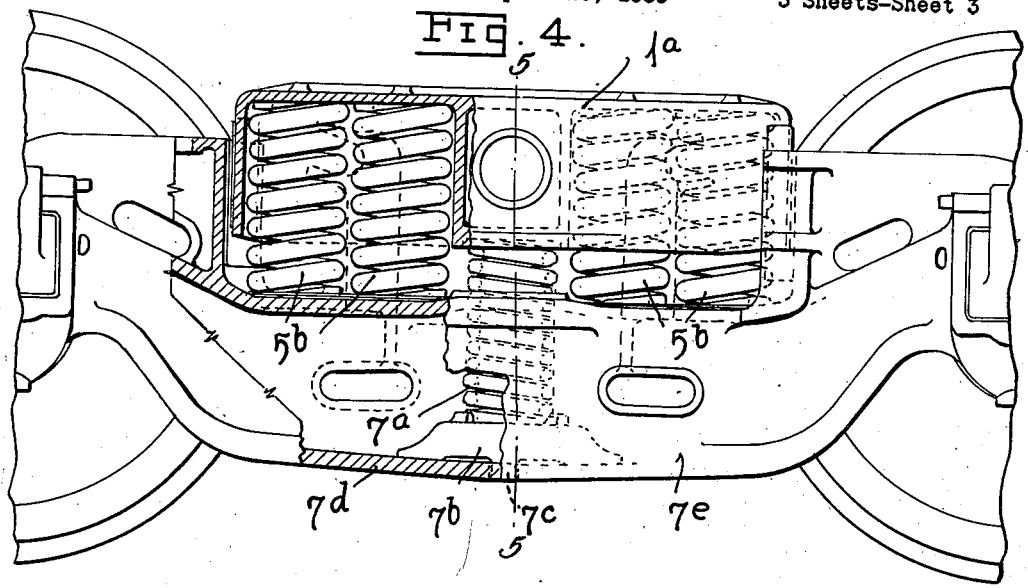
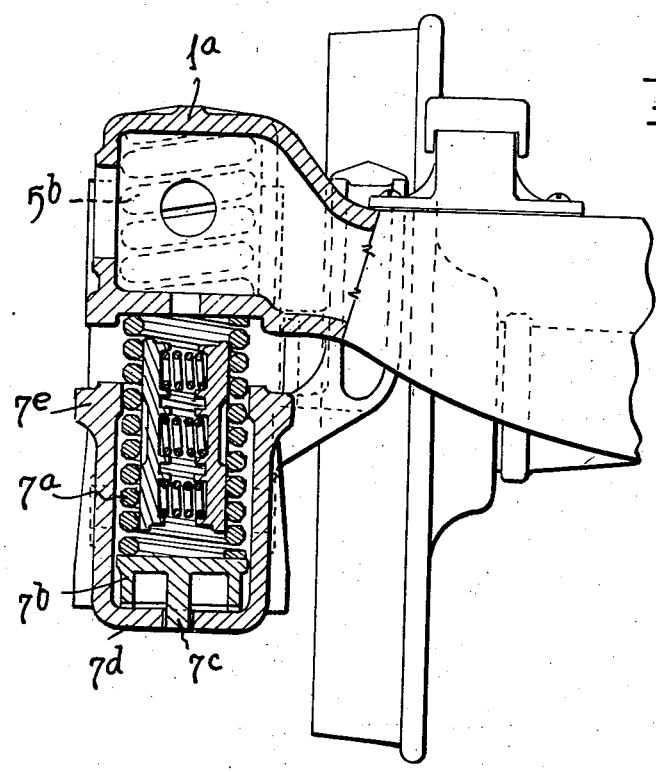

Patented Mar. 11, 1941

2,234,414

UNITED STATES PATENT OFFICE 2,234,414

RAILWAY CAR TRUCK

Claude L. Orr, Bexley, Ohio, assignor to The Buckeye Steel Castings Company, Bexley, Ohio Application April 29, 1939, Serial No. 270,884

4 Claims. (Cl. 105—197.2)

This invention relates to improvements in railway car trucks and more particularly to a four-wheel car truck designed for easy riding and high speed service.

Some of the objects of the invention are to provide a truck so designed as to incorporate parts which are few in number and economically produced; to permit the use of springs of relatively long travel which are accommodated without increasing the over-all height of the truck; to allow the use of leaf springs of relatively long span or its equivalent in parallel with coil springs, a combination which produces "easy riding" of the car vehicle. Such design has the further advantage over truss type side frame trucks of having the top central portion of the truck travel with the springs thereby reducing the clearance required between the top of the truck and the car body, as compared with the top of truss-type side frames which do not travel with the springs. This permits the car body to be built relatively low even with springs of increased travel. Standard car body designs require trucks of certain overall heights in order to preserve their capacity and structural requirements, and in the conventional trucks any increase in the length and travel of the springs increases the overall height of the truck side frame and disturbs the structural design of the standard car body.

Another object of the invention is to supply a truck which will maintain itself substantially square without the use of spring planks or rigid transoms.

A still further object is to furnish a truck having a spring arrangement which loads the side frame near the axle journals, thereby reducing bending moments as compared with the conventional method of supporting the springs at the middle of the side frame span.

A still further object is to produce a truck having a wide spring spacing which provides resilient means between the vehicle body and the unsprung parts of the truck near the axle journals thereby contributing to "easy riding."

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Fig. 4 is a side elevation partly in vertical section of a modification.

Fig. 5 is a transverse vertical section taken on line 5—5 of Fig. 4 with a portion of the transverse bolster shown in elevation.

Figure 1:
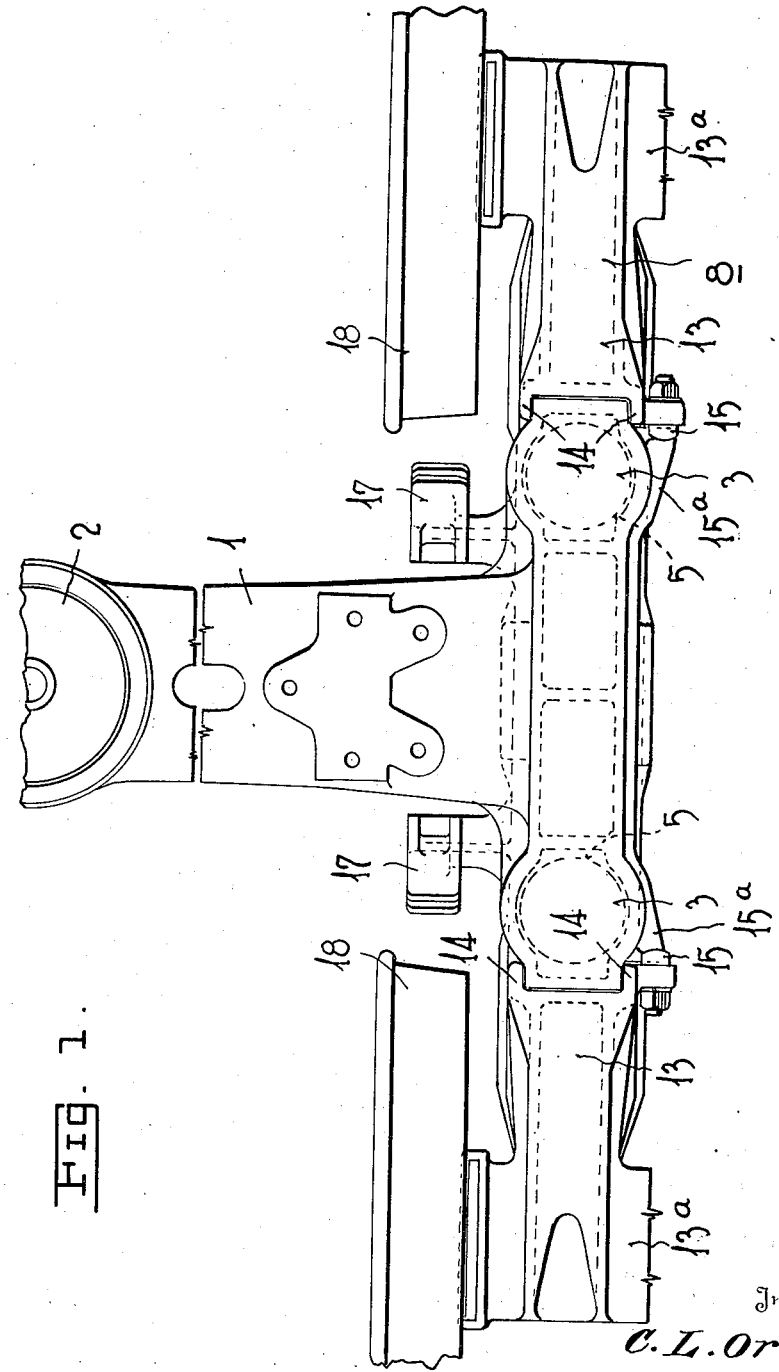
Fig. 1 is a top plan view of one half of a truck constructed in accordance with my invention and with certain parts removed to facilitate illustration.
Figure 2:
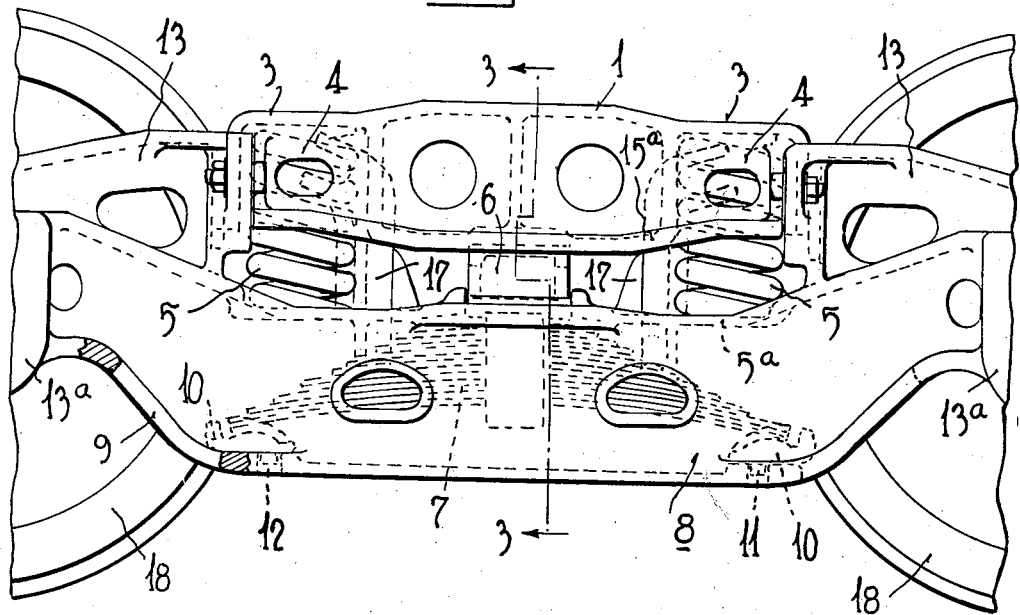
Fig. 2 is a side elevation of the same.
Figure 3:
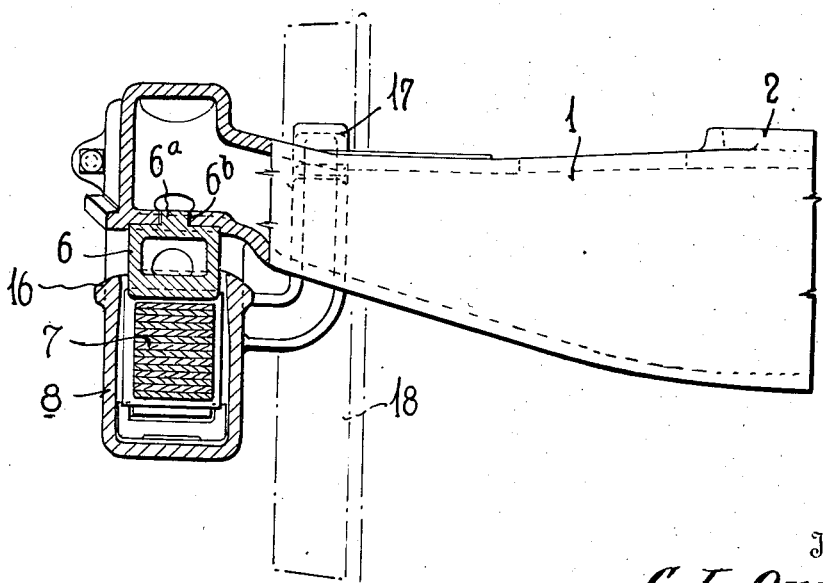
Fig. 3 is a transverse vertical sectional view on the line 3—3 of Fig. 2 but with the greater portion of the transverse bolster shown in elevation.

Referring to the drawings (Figs. 1 to 3), 1 designates a transverse bolster having a center plate 2 and end arms 3 which extend lengthwise of the truck at opposite sides of the bolster. Each arm forms a downwardly opening pocket 4 for the reception of the upper end portions of the coil springs 5 mounted on a transverse web 5a of a side frame member of special construction. Each end of the bolster also has its central portion resting on a block 6 which may be entirely integral with the bolster or may be interlocked therewith by means of an upstanding pin 6a on the block extending into a hole 6b in the bottom of the bolster.

The block rests on the medial portion of a leaf spring 7 which is positioned within the side frame member 8, and extends for the greater portion of the length thereof. The bottom of the side frame member is provided with an opening 9 to permit the introduction or removal of the leaf spring, and the ends of the latter rest on spring seats 10 positioned in close proximity to the journal boxes 13a of the truck. The spring seats may be integral with the side frame or rigidly united therewith, but I prefer to make each spring seat as a separate element, which may rest on the bottom and have a pin 11 interlocked with a hole 12 in said bottom. I also prefer to arrange the portion of the web 5a which forms the top of the medial portion of the side frame member 8 below the tops of the journal boxes 13a so as to decrease the over-all height of the truck.

The frame member 8 has a guide bracket 13 at each end having lugs 14 engaging the end portions of the arms 3 and guiding the bolster. Removable bolts 15 are connected to the outer lugs with their heads overlying an outwardly projecting flange 15a at the end of the bolster to prevent accidental disengagement of the bolster from the rest of the truck.

The top of the side frame is provided with an aperture 16 to accommodate vertical movement of the block 6, and the side frame may be provided with brake hanger brackets 17. Of course, the axles (not shown) carried by the wheels 18 of the truck, are journalled in the boxes 13a.

In addition to having long spring travel, an easy riding railway truck should also be provided with some device which will absorb a portion of the recoil energy of the coil springs 5. In the arrangement shown, the leaf spring 7 not only assists the coils in supporting the load of the body but also acts as an energy absorbing device due to the friction between the leaves.

Instead of employing a single coil spring between the middle of the side frame member and each end thereof, I may employ two or more coil springs 5b, as shown in Fig. 4.

Furthermore, the leaf spring 7 may be replaced by any suitable snubber type spring 7a, as shown in Figs. 4 and 5. In such modification, the spring 7a might rest on a short pedestal 7b having a depending lug 7c extending into a hole in the bottom web 7d of the side frame member 7e. Of course, in this construction the medial portion of the end of the transverse bolster 1a would rest on the top of the snubber spring.

My improved design has the advantage of permitting the use of a spring arrangement in which the springs are placed nearer the journals than in the truss type of side frame truck. This wide spring group has several advantages:

(1) It allows the side frame member to be loaded, both vertically and transversely near the journals thereby reducing the side frame stresses from both of these loadings.

(2) It contributes to easy riding by providing resilient means between the side frame and the vehicle body near the axle journals.

(3) The widely spaced coil springs have a more positive squaring action on the truck than the narrower and more compact group and with the conventional truss type side frame truck.

The speed of many fast freight trains and other special service trains is equal to ordinary passenger train speeds, and speeds of 70 to 75 miles per hour are anticipated for future fast freight. It is therefore desirable to have an easy-riding truck that can be economically produced for high speed freight service.

Many modifications of the invention will be apparent to those skilled in the art without departing therefrom or from the scope of the claims, and since the foregoing disclosure has been given by way of example for clearness and understanding, no unnecessary limitations should be understood and the appended claims should be construed as illustrative and not in a limiting sense.

What I claim and desire to secure by Letters Patent is:

1. In a car truck, a wheel-supported beam-type side frame member at each side of the truck having a journal box at each end thereof, and a box-section portion extending substantially from one journal box to the other, the box-section portion of each side frame member having upwardly projecting bolster guides arranged adjacent to the journal boxes of that member, a substantially H-shaped bolster provided with pairs of oppositely extending arms slidably engaging said bolster guides, helical springs positioned on top of each of said box-section portions and arranged at opposite sides of the transverse center line of the truck and beneath said arms, the end portions of the bolster being supported by said helical springs, and other spring means having frictional absorption properties, housed substantially in said box section portions, and having contact with said bolster along said transverse center line, said spring means resting on the bottom of the side frame box-section portions.

2. In a car truck, a wheel-supported beam-type side frame member at each side of the truck having a journal box at each end thereof, and a box-section portion extending substantially from one journal box to the other, the box-section portion of each side frame member having upwardly projecting bolster guides arranged adjacent to the journal boxes of that member, a substantially H-shape bolster provided with pairs of oppositely extending arms slidably engaging said bolster guides, helical springs positioned on top of each of said box-section portions and arranged at opposite sides of the transverse center line of the truck and beneath said arms, the end portions of the bolster being supported by said helical springs, and other spring means having frictional absorption properties, housed substantially in said box section portions, and having contact with said bolster along said transverse center line, said spring means resting on the bottom of the side frame box-section portions and comprising substantially vertically disposed helical springs.

3. In a car truck, a wheel-supported beam-type side frame member at each side of the truck having a journal box at each end thereof, and a box-section portion extending substantially from one journal box to the other, the box-section portion of each side frame member having upwardly projecting bolster guides arranged adjacent to the journal boxes of that member, a substantially H-shaped bolster provided with pairs of oppositely extending arms slidably engaging said bolster guides, helical springs positioned on top of each of said box-section portions and arranged at opposite sides of the transverse center line of the truck and beneath said arms, the end portions of the bolster being supported by said helical springs, and a leaf spring housed substantially in each of said box-section portions and having its ends resting on the bottom of such portion at points substantially immediately below the helical springs at that side of the truck, each of said leaf springs having contact with said bolster along said transverse center line.

4. In a car truck, a wheel-supported beam-type side frame member at each side of the truck having a journal box at each end thereof, and a box-section portion extending substantially from one journal box to the other, the box-section portion of each side frame member having upwardly projecting bolster guides arranged adjacent to the journal boxes of that member, a substantially H-shape bolster provided with pairs of oppositely extending arms slidably engaging said bolster guides, helical springs positioned on top of each of said box-section portions and arranged at opposite sides of the transverse center line of the truck and beneath said arms, the end portions of the bolster being supported by said helical springs, and a leaf spring housed substantially in each of said box-section portions and having its ends resting on the bottom of such portion at points substantially immediately below the helical springs at that side of the truck, each of said leaf springs having contact with said bolster along said transverse center line, the bottom of each box-section portion being provided with an opening to facilitate introduction of the leaf spring into said portion and its removal therefrom.

CLAUDE L. ORR.